United States Patent [19]

Bauer et al.

[11] Patent Number: 4,988,845
[45] Date of Patent: Jan. 29, 1991

[54] DEVICE TO CUT AND BUTT-WELD BANDS OR METAL SHEETS HAVING LIMITED DIMENSIONS

[75] Inventors: Helmut Bauer, Karben; Gunter Wilkens, Kelkheim, both of Fed. Rep. of Germany

[73] Assignee: Oxytechnik Gesellschaft, Fed. Rep. of Germany

[21] Appl. No.: 538,775

[22] Filed: Jun. 15, 1990

[30] Foreign Application Priority Data

Jun. 24, 1989 [DE] Fed. Rep. of Germany ....... 3920825

[51] Int. Cl.$^5$ .............................................. B23K 26/00
[52] U.S. Cl. ............................ 219/121.63; 219/121.77
[58] Field of Search ...................... 219/121.67, 121.72, 219/121.63, 121.64, 121.85, 121.6, 158, 161, 121.77

[56] References Cited

U.S. PATENT DOCUMENTS 4,623,777 11/1986 Aihara et al. .............. 219/121.13 X
4,626,651 12/1986 Taniguchi et al. ............. 219/121.63

FOREIGN PATENT DOCUMENTS 0151848 8/1985 European Pat. Off. ....... 219/121.63

Primary Examiner—C. L. Albritton
Attorney, Agent, or Firm—Connolly & Hutz

[57] ABSTRACT

A device to cut and butt-weld bands or metal sheets having limited dimensions by means of a laser device and shears which have two shearing blades facing downwards and arranged at a certain distance from each other on a pivoting shearing beam, and these blades carry out an essentially vertical cutting motion.

In order to reduce the cycle time for cutting and welding bands and metal sheets, they are clamped onto a backing strip on the upper side of the shearing beam by means of clamping jaws and welded with a laser beam decoupled from a laser resonator.

15 Claims, 2 Drawing Sheets

DEVICE TO CUT AND BUTT-WELD BANDS OR METAL SHEETS HAVING LIMITED DIMENSIONS

BACKGROUND OF THE INVENTION

Such devices as are the subject of the invention are used, among others, in the automobile industry to produce functional automobile body parts by joining sheet metal parts having different or identical thicknesses. The properties of the parts such as, for example, their surface coating, can be different. If possible, the welding seams created with the device should not be thicker than the metal sheets, so that any further processing by stamping or cold forming is not impaired.

Therefore, a laser device is used as the welding source for the butt-joined metal sheets, which are essentially up to 3 mm thick. When laser radiation is used for welding, a very narrow welding seam is formed with almost no seam elevation and the surrounding material heats up less than with conventional processes. Moreover, the required properties can be achieved at high welding speeds. For this reason, laser devices are used more and more frequently to join bands or metal sheets (European Patent No. 0,151,848 B1, European Patent No. 0,299,358 A1, West German Patent No. 3,502,368 A1).

However, the use of a laser device as the welding source calls for a precise preparation of the welding seam. The permissible joint between the parts to be joined depends on the thickness of the metal sheets and it must be <0.1 mm in the case of thin parts. The position tolerance of the butt joint must also be <0.1 mm. An effort is made to try to fulfill these requirements by using shears with blades on both sides in order to cut the ends, of the bands or metal sheets. While the ends are being cut, the bands or metal sheets are held between clamping elements.

European Patent No. 0,151,848 B1 proposes shears that can be moved laterally into and out of the welding area to cut the ends, whereby the ends are held between the lower blades and the clamping elements. After the cutting step, that is, after the shears have been moved out of the welding area, the ends are clamped between the clamping elements and a backing strip which can be moved horizontally.

The result is a long cutting cycle time due to the shears which can be moved in and out laterally, and due to the subsequent separate movement of the backing strip.

This cutting cycle time can be reduced by means of shears disclosed in West German Patent No. 3,044,350 C3, which are attached to a carriage in such a way that they can pivot; the height of the carriage, in turn, can be adjusted on a holding beam. This achieves maximum accessibility to the working space during the welding procedure without the shears having to be moved in and out. A backing strip is attached to the pivoting shears and this backing strip is fixed in its working position when the shears are in their uppermost position.

Moreover, West German Patent No. 1,116,034 C3 discloses a saw to cut the ends of bands and a welding torch as the welding source.

It has also already been proposed to use shearing blades and to combine them with a backing strip to form an integrated component (West German Patent No. 1,216,073, Swiss Patent No. 390,658). In this construction, the shearing blades and the backing strip rest upon an upper cross beam supported by two vertical beams that can be moved up and down together, whereby the shearing blades are located on the bottom side of the upper cross beam. After the seam has been made, the upper cross beam with the shearing blades is positioned underneath the band level, so that the backing strip is now underneath the band ends which are to be welded together.

In this known embodiment, it is no longer possible, for example, to cut the band once again immediately after a flawed welding step by means of the shearing blades positioned underneath, and for this reason, this embodiment has never been implemented in actual practice. Moreover, it is also disadvantageous that the band ends are not clamped onto the backing strip but rather between upper and lower pairs of clamping jaws.

SUMMARY OF THE INVENTION

The invention is based on the object of reducing the cycle time during the cutting and welding of bands and metal sheets.

The invention is based on the surprising realization that, when a lasser device is used and when metal sheets having limited dimensions are processed, the disadvantages that exist in conjunction with the last-mentioned patent are not present.

On the contrary, the metal sheets having limited dimensions can be simply removed from the device in the case of flawed welding; on the other hand, the metal sheets as well as the bands, which are unrolled from reels, can simply be cut by switching over the laser device from the welding mode to the cutting mode. On the basis of this realization, it is now advantageously possible to considerably reduce the cycle time for cutting and welding, since the shears do not have to be moved back to their initial position, and the backing strip only travels a minimal distance to reach its working position. Moreover, since the shearing beam can be moved from both sides and advantageously at the same time on cylinders, it is possible to quickly position the backing strip. For this purpose, it is arranged on the same level as the band or metal sheet supports. The exact positioning is carried out by finely adjustable stops which restrict the movement of the shearing beam. The bands or metal sheets then lie on the backing strip and are clamped onto it with the upper clamping elements. Due to this procedure, perfect positioning of the preferably thin bands or metal sheets is possible, something which is necessary for laser welding.

The invention provides free accessibility to the working space after the cutting while the machine height is relatively low.

After the bands or metal sheets have been cut, the cylinder located on the bearing side ensures that the backing strip takes the desired position on this side. The cylinder located on the other side brings about an additional pivoting motion, by means of which the band or metal sheets ends are cut completely over their entire width, and the backing strip is positioned horizontally in the level of the bands or metal sheets.

By combining the vertical and rotary movements around a pin, the device cannot get jammed, because the guide element associated with the opposite side of the shearing beam is guided only laterally—as seen in the cutting direction. This allows for the possibility for both cylinders to work at the same time—but independent of one another with respect to their strokes. As a result, the cycle time and the control operations are advantageously reduced.

In an advantageous embodiment, the laser device is arranged parallel to metal sheet feed or discharge devices, by means of which the metal sheets are automatically carried to the device that cuts and butt-welds them. The laser beam, which is decoupled from the laser resonator, is deflected essentially at a right angle to its emission direction via a lens and deflected to a laser head via additional optical elements. In the laser heads arranged movably along the butt-joined ends of the bands or of the metal sheets, the laser beam is focussed in or before the processing site.

In another advantageous embodiment, a laser beam decoupled from the lawer resonator is alternately guided to two devices that cut and butt-weld, so that two devices can function in an alternating cycle. As a result of this approach, with which only one laser device is needed for two butt-welding devices, it is possible to increase the economic efficiency.

THE DRAWINGS

FIG. 3 is a schematic side view of the pivoting shears.

DETAILED DESCRIPTION

Figure 1:
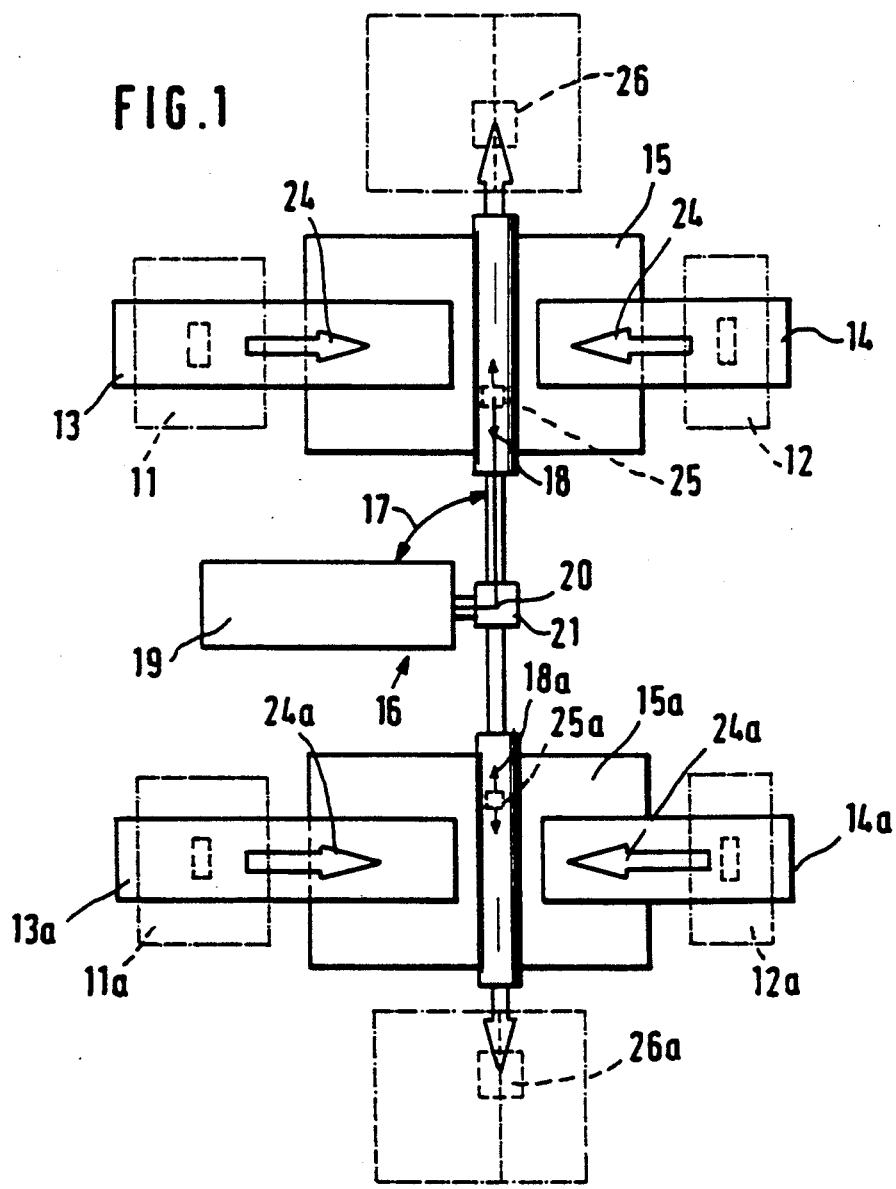
FIG. 1 illustrates a schematic top view of the device according to the invention.

FIG. 1 shows a device to process metal sheets 11, 11a, 12, 12a having limited dimensions, on the basis of which the invention will be explained below. The metal sheets are taken from a stack by means of metal sheet feed devices 13, 13a, 14, 14a and, preferably automatically, conveyed for cutting and butt-welding to the devices 15, 15a, which are positioned parallel to each other. Between the devices 15, 15a, a laser device 16 is positioned at an angle 17, preferably at a right angle, to the welding device 18, 18a. The laser beam 20 which is decoupled from the laser resonator 19 is deflected via a lens 21 alternately to the laser heads 25, 25a which are arranged movably along the butt-joined ends 22, 23 of the bands or of the metal sheets 13, 14 (FIG. 2), so that the metal sheets 11, 12 or 11a, 12a are welded one after the other in both devices 15, 15a.

Subsequently, the joined metal sheets 11, 12 or 11a, 12a are taken out on the side opposite to the inlet side from where the laser beam 21 enters the devices 15, 15a, i.e. essentially at a right angle to the metal sheet feed direction 24 by means of metal sheet removal devices 26, 26a.

Figure 2:
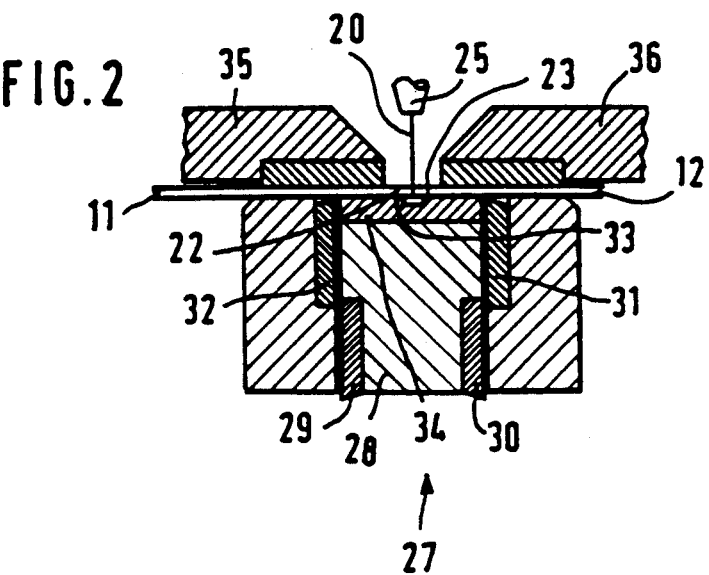
FIG. 2 is a schematic cross section of the shears with the backing strip after the bands have been cut.

Before the metal sheets 11, 12 or 11a, 12a are butt-welded, they are cut with shears 27 with blades on both sides. For this purpose, the shears 27 have two shearing blades 29, 30 facing downwards and arranged at a certain distance from each other on a pivoting shearing beam 28 (FIGS. 2 and 3). When the ends 22, 23 of the metal sheets are cut, the shearing blades 29, 30 operate together. Due to the cutting motion which is carried out from a position above, the shears 27 with the upper side 33 of the shearing beam 28 are located below the metal sheets. The lower end position of the shearing beam 28 is determined by the stops 47,48.

For this purpose, both sides 37, 38 of the shears 27 are connected with a cylinder 39,40. In order to generate the cutting motion, the shearing beam 28 is moved on both sides 37, 38 and at the same time in the direction of the band or metal sheet side 46. The motion of the two cylinders 39,40 takes place independent of one another.

The shearing beam 28 is forked-shaped on the side 37 and surrounds a vertical beam 42. A pin 41 is placed through the fork and the vertical beam 42, and the shearing beam 28 having the shearing blades 29, 30 pivots; around this pin. An oblong hole perforated guide 43 in the vertical beam makes it possible to vertically shift the pin 41. On the side 38, the shearing beam 28 has a guide element 44, which is guided laterally between the guide bars 45.

The backing strip 34 arranged on the upper side 33 of the sharing beam 28 is positioned on the level of the metal sheets after the cutting step (dotted line in FIG. 3).

By means of clamping elements 35, 36, the metal sheets are clamped onto the backing strip 34 and the metal sheets are joined by means of the laser beam 20. In this process, the clamping of the metal sheets onto the backing strip 34 ensures an especially precise positioning.

In the case of flawed welding seams, the joined metal sheets are either removed from the devices 15, 15a, or else the laser device is switched over to the cutting mode by means of a switch-over mechanism. The metal sheets can then be cut by the laser beam 20, the shears 27 can be moved back to their parked position and the ends of the metal sheets can be cut again with the shears.

What is claimed is:

1. In a device to cut and butt-weld bands or metal sheets having limited dimensions with a laser device and with shears, which have two shearing blades facing downwards and arranged at a certain distance from each other on a pivoting shearing beam, and these blades carry out an essentially vertical cutting motion, the improvement being in that the bands or metal sheets are clamped onto a backing strip positioned on the upper side of said shearing beam by means of clamping jaws, and a laser beam decoupled from a laser resonator for welding the bands or metal sheets.

2. Device according to claim 1, characterized in that, said shearing beam is moved vertically on both sides and at the same time by means of cylinders in the direction of the upper sides of the band or metal sheets in order to generate the cutting motion.

3. Device according to claim 2, characterized in that the motion of said cylinders takes place independent of one another, and the lower end position of said shearing beam is determined by stops.

4. Device according to claim 3, characterized in that one side of said shearing beam is supported in such a way as to pivot around a pin which can be vertically shifted.

5. Device according to claim 4, characterized in that the other side of said shearing beam has a guide element which is guided laterally between guide bars.

6. Device according to claim 5, characterized in that the metal sheets can be conveyed into the cutting and welding area by two sheet metal feed devices which are located across from each other and which are substantially vertical to the welding direction.

7. Device according to claim 6, characterized in that the welded metal sheets can be conveyed out of the cutting and welding area by a metal sheet removal device which is positioned substantially vertically to the sheet metal feed devices.

8. Device according to claim 7, characterized in that said laser resonator is arranged at a right angle to the welding direction and in that said laser beam can be selectively decoupled from the laser resonator and can be pivoted to several laser heads.

9. Device according to claim 8, characterized in that said laser device has a switch-over device with which the laser device can be switched over to and from the welding mode and the cutting mode.

10. Device according to claim 1, characterized in that one side of said shearing beam is supported in such a way as to pivot around a pin which can be vertically shifted.

11. Device according to claim 10, characterized in that the other side of said shearing beam has a guide element which is guided laterally between guide bars.

12. Device according to claim 1, characterized in that the metal sheets can be conveyed into the cutting and welding area by two sheet metal feed devices which are located across from each other and which are substantially vertical to the welding direction.

13. Device according to claim 1, characterized in that the welded metal sheets can be conveyed out of the cutting and welding area by a metal sheet removal device which is positioned substantially vertically to the sheet metal feed devices.

14. Device according to claim 1, characterized in that said laser resonator is arranged at a right angle to the welding direction and in that said laser beam can be selectively decoupled from the laser resonator and can be pivoted to several laser heads.

15. Device according to claim 1, characterized in that said laser device has a switch-over device with which the laser device can be switched over to and from the welding mode and the cutting mode.

* * * * *